United States Patent [19]

Jurras, III

[11] Patent Number: 5,701,119

[45] Date of Patent: Dec. 23, 1997

[54] LINED BEARING WITH WEAR SENSOR

[75] Inventor: Mark L. Jurras, III, Canton Center, Conn.

[73] Assignee: The Torrington Company, Torrington, Conn.

[21] Appl. No.: 782,375

[22] Filed: Jan. 13, 1997

Related U.S. Application Data

[63] Continuation of Ser. No. 509,306, Jul. 31, 1995, abandoned.

[51] Int. Cl.⁶ .................................................. G08B 21/00
[52] U.S. Cl. .......................... 340/682; 340/514; 384/448
[58] Field of Search ................................. 340/682, 540, 340/514; 384/448; 324/71.1

[56] References Cited

U.S. PATENT DOCUMENTS

| | | | |
|---|---|---|---|
| 3,102,759 | 9/1963 | Stewart | 384/276 |
| 3,108,264 | 10/1963 | Heinoo | 340/682 |
| 3,775,680 | 11/1973 | Egeland | 340/682 X |
| 3,897,116 | 7/1975 | Carpenter | 340/682 X |
| 4,320,431 | 3/1982 | Bell | 340/682 X |
| 4,584,865 | 4/1986 | Hutchins | 340/682 X |

FOREIGN PATENT DOCUMENTS

| | | | |
|---|---|---|---|
| 21 15 506 | 10/1972 | Germany . | |
| 56-018119 | 2/1981 | Japan . | |
| 61-054402 | 3/1986 | Japan . | |
| 727886 | 4/1980 | U.S.S.R. | 340/682 |
| 2 192 949 | 1/1988 | United Kingdom . | |

*Primary Examiner*—Thomas Mullen
*Attorney, Agent, or Firm*—John C. Bigler

[57] ABSTRACT

A bearing liner between inner and outer bearing rings, one stationary and the other rotatable, is fixed to the stationary bearing ring. A pair of electrical conductors, coiled in at least one loop encircling the inner bearing ring, is embedded within the bearing liner. The electrical conductors are electrically isolated and located such that wear of the bearing liner causes the rotatable bearing ring to contact and electrically connect the electrical conductors. An electrical circuit detects the electrical connection to indicate wear of the bearing liner.

15 Claims, 2 Drawing Sheets

LINED BEARING WITH WEAR SENSOR

This is a continuation of application Ser. No. 08/509,306 filed Jul. 31, 1995 abandoned.

BACKGROUND OF THE INVENTION

This invention relates generally to lined bearings and, more particularly, to a lined bearing with a sensor permitting remote monitoring of wear.

Lined bearings are used in a wide variety of applications and, due to improvements in bearing design and bearing materials, lined bearings are now used in many applications where rolling element bearings were used previously. On many aircraft, for example, lined bearings with a liner of polymer material may be used in place of needle roller bearings to realize substantial savings in weight and complexity. However, because large numbers of such bearings are required to support the movable control surfaces on large aircraft, considerable effort and expense are required to periodically check each of the lined bearings for excessive wear.

The foregoing illustrates limitations known to exist in present lined bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a lined bearing having an axis, an inner bearing ring, an outer bearing ring concentric with the inner bearing ring, one of the bearing rings being stationary and the other being rotatable about the axis, and a bearing liner within an annular space between the bearing rings and fixed to the stationary bearing ring. A pair of electrical conductors is embedded in the bearing liner, coiled in at least one loop encircling the inner bearing ring, each of the electrical conductors being electrically isolated and located such that wear of the bearing liner will cause the rotatable bearing ring to contact and electrically connect the electrical conductors. An electrical circuit detects the electrical connection to indicate wear of the bearing liner.

In another aspect of the present invention, this is accomplished by providing a system for monitoring wear of several lined bearings.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
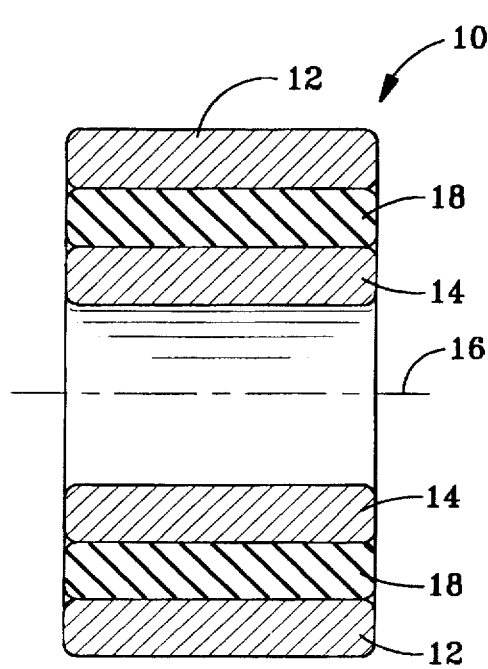
FIG. 1 is a cross-sectional view of a typical lined bearing according to the prior art.

Referring now to the drawings, FIG. 1 illustrates lined bearing 10, typical of the prior art, as used, for example, as an aircraft track roller bearing. Outer bearing ring 12 and inner bearing ring 14 are concentric about axis 16 and are typically made of stainless steel. Bearing liner 18, located within an annular space between the bearing rings, may be made of a polymer material.

Figure 2:
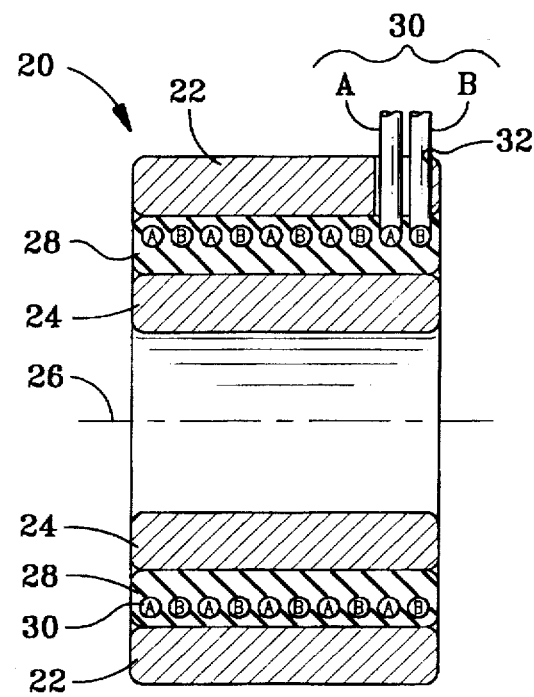
FIG. 2 is a cross-sectional view of a lined bearing with wear sensor illustrating a first embodiment of the present invention.

FIG. 2 illustrates lined bearing 20 of the present invention, including a wear sensor. Outer bearing ring 22 and inner bearing ring 24 are concentric about axis 26. One of the bearing rings 22 and 24 is stationary with respect to its mounting, and the other bearing ring is rotatable about axis 26. Bearing liner 28 is located within an annular space between outer bearing ring 22 and inner bearing ring 24 and is fixed to the stationary bearing ring.

A pair of electrical conductors 30 is embedded in bearing liner 28 such that each conductor, designated A or B, is coiled in a helix or similar form with at least one loop encircling inner bearing ring 24. A and B alternate along the axial length of the bearing and are electrically isolated from each other. Electrical conductors 30 are located within bearing liner 28, along the stationary bearing ring, such that wear of the bearing liner will cause the rotatable bearing ring to contact and electrically connect electrical conductors A and B.

Preferably, bearing liner 28 is made of a low-friction polymer, such as a TFE (teflon) composite, and is a poor conductor of electricity, avoiding the need to provide separate insulation of electrical conductors 30. However, to ensure good electrical isolation of the conductors, they can be coated with enamel or other coating similar to that used with magnet wire. In the embodiment of FIG. 2, outer bearing ring 22 is stationary and inner bearing ring 24 is rotatable about axis 26 relative to outer bearing ring 22. At least one opening 32 within the stationary bearing ring is provided to permit electrical connection to detecting means and a remote monitor by external wires.

Figure 3:
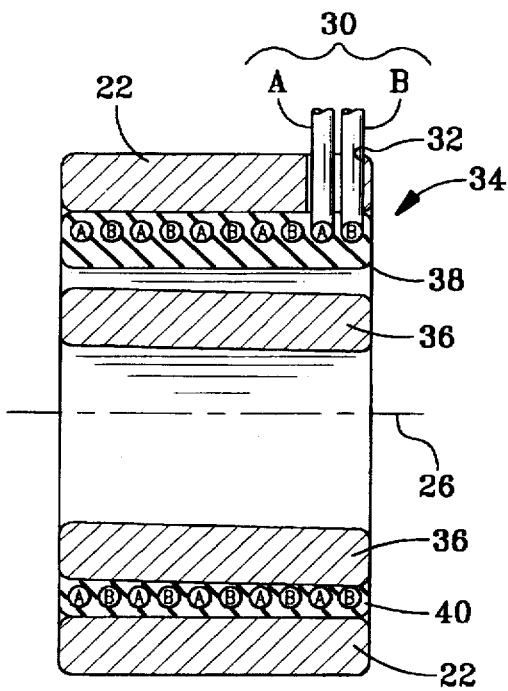
FIG. 3 is a cross-sectional view of the lined bearing with wear sensor of FIG. 2, following excessive wear.

FIG. 3 illustrates lined bearing 20 after excessive wear, and is enumerated as lined bearing 34 to distinguish the initial configuration. Outer bearing ring 22 is unchanged, and inner bearing ring 36 shows little wear but is no longer concentric about axis 26. Bearing liner upper portion 38 shows little wear, but bearing liner lower portion 40 shows excessive wear. The excessive wear causes shorting of electrical conductors 30 due to contact with rotating inner bearing ring 36, that is made of metal or is coated to conduct electricity. If electrical conductors 30 are coated to ensure electrical isolation, as described above, the coating will easily wear away when the rotating bearing ring rubs against the coating.

Figure 4:
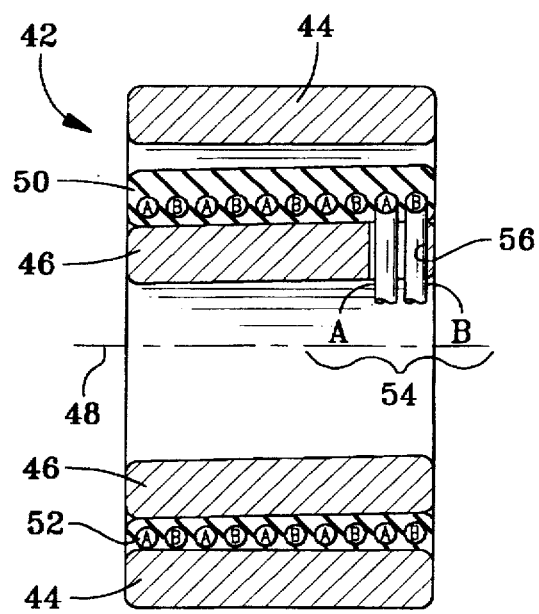
FIG. 4 is a cross-sectional view of a lined bearing with wear sensor illustrating a second embodiment of the present invention, following excessive wear.

FIG. 4 illustrates lined bearing 42 similar to lined bearings 20 and 34 but having a stationary inner bearing ring, as found in a typical track roller bearing. Outer bearing ring 44 is similar to outer bearing ring 22 of FIG. 2. Inner bearing ring 46 is not concentric about axis 48 due to excessive wear of the rotating outer bearing ring against bearing liner 50 at portion 52. Electrical conductors 54 are coiled around inner bearing ring 46 in alternating A and B locations to indicate excessive wear, similar to electrical conductors 30 of the first embodiment. Bearing liner is fixed to stationary inner bearing ring 46 and is electrically connected to detector means and a remote monitor through at least one opening 56.

Figure 5:
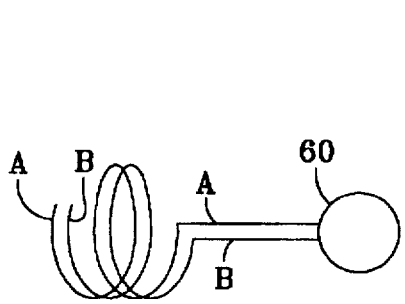
FIG. 5 is a schematic drawing of an electrical circuit for monitoring the condition of the lined bearing with wear sensor of the present invention.
Figure 6:
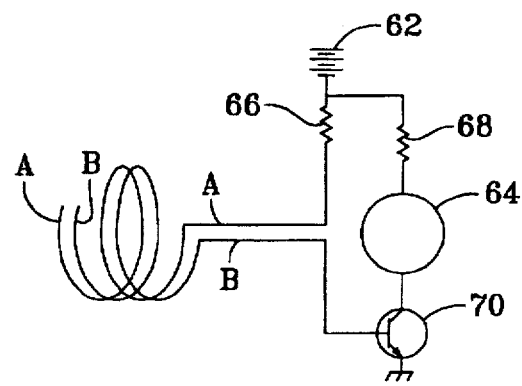
FIG. 6 is a schematic drawing of an alternative electrical circuit to monitor the condition of the lined bearing with wear sensor of the present invention.

FIG. 5 illustrates schematically a simple means for detecting the electrical connection of electrical conductors 30 or 54 that results with excessive wear. Ohmmeter 60 senses the decreased electrical resistance between A and B and can serve as a remote monitor of the lined bearing. Alternatively, power source 62 may apply a voltage to either A or B, as illustrated schematically in FIG. 6, and ammeter 64 may be used as a remote monitor of the lined bearing. Resistors 66 and 68 serve as biasing resistors and transistor 70 serves as a switch. When electrical conductors 30 or 54 are shorted, current will flow, signaling excessive wear.

Figure 7:
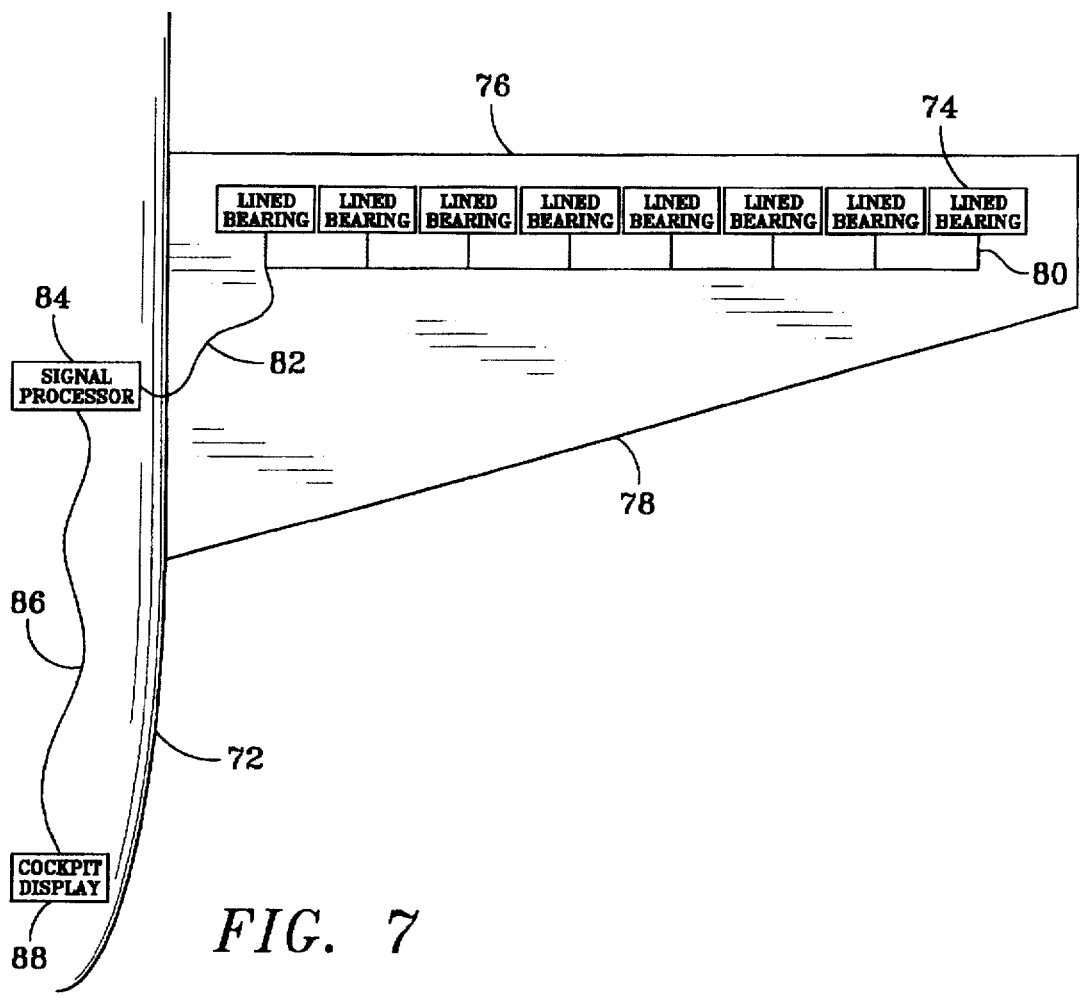
FIG. 7 is a schematic drawing of a typical aircraft application of the lined bearing with wear sensor of the present invention.

FIG. 7 illustrates schematically fuselage 72 of an airplane equipped with several lined bearings 74 along rear control surface 76 of wing 78. Electrical wires 80, in pairs, are joined as cable 82 connecting lined bearings 74 to signal processing means 84. Signal processing means 84 may be a simple switch enabling manual connection of a detector Similar to those of FIGS. 5 and 6 to one of lined bearings 74 or maybe more automated, such as a computerized multiplexer and signal conditioner for sequential testing of lined bearings 74. Output for signal processing means 84 may be connected by electrical wires 86 to a warning lamp or other cockpit display 88. The signal processing means may also, be made detachable for use by ground crews, if the built-in test feature is not desired.

From the above description, it will be apparent that the present invention provides an effective and convenient means of monitoring lined bearings to sense excessive wear. Electrical conductors that serve as sensing elements are placed selectively with the bearing liner to permit only the desired amount of wear, and electrical connections are led through the stationary bearing ring without interfering with operation of the lined bearings. The wear sensor oft he present invention is particularly suited for use with airplane control surfaces using large numbers of lined bearings.

Having described the invention, what is claimed is:

1. A lined bearing comprising:

an inner bearing ring having an axis;

an outer bearing ring concentric with the inner bearing ring and providing an annular space therebetween;

one of the inner bearing ring and the outer bearing ring being stationary and the other of the inner bearing ring and the outer bearing ring being rotatable about the axis;

a bearing liner within the annular space and fixed to the stationary bearing ring; and a pair of electrical conductors embedded in the bearing liner, coiled in at least one loop encircling the inner bearing ring, each of the electrical conductors being electrically isolated and located such that wear of the bearing liner will cause the rotatable bearing ring to contact and electrically connect the electrical conductors.

2. The lined bearing according to claim 1, wherein the bearing liner has two axial ends and the at least one loop encircling the inner bearing ring extends from one axial end of the bearing liner to the other axial end of the bearing liner.

3. The lined bearing according to claim 1, wherein the inner bearing ring is the stationary bearing ring.

4. The lined bearing according to claim 1, wherein the outer bearing ring is the stationary bearing ring.

5. The lined bearing according to claim 1, wherein the coiled electrical conductors form a helix.

6. The lined bearing according to claim 1, wherein the electrical conductors are parallel and adjacent such that the electrical conductors have the same pitch and diameter and alternate in the axial direction.

7. The lined bearing according to claim 1, further comprising detecting means for detecting the electrical connection of the electrical conductors to indicate wear of the bearing liner.

8. The lined bearing according to claim 7, wherein the detecting means includes an ohmmeter to detect a shorting of the electrical conductors.

9. The lined bearing according to claim 7, wherein the detecting means includes an ammeter to indicate an increase in current passed through the electrical conductors.

10. The lined bearing according to claim 7, wherein the detecting means includes wires passing through said stationary bearing ring.

11. The lined bearing according to claim 7, further comprising means for connecting the detecting means to a remote visual display.

12. A system for monitoring wear of lined bearings, the system comprising:

a plurality of lined bearings, each of the lined bearings having an axis, an inner bearing ring, an outer bearing ring concentric with the inner bearing ring, one of the inner bearing ring and the outer bearing ring being stationary and the other of the inner bearing ring and the outer bearing ring being rotatable about the axis, and a bearing liner between the inner bearing ring and the outer bearing ring and fixed to the stationary bearing ring;

a pair of electrical conductors embedded in the bearing liner in each of said bearings, the pair of electrical conductors being coiled in at least one loop encircling the inner bearing ring, each of the electrical conductors being electrically isolated and located such that excessive wear of the bearing liner will cause said rotatable bearing ring to contact and electrically connect the electrical conductors; and signal processing means for processing electrical signals from the electrical conductors of the lined bearings to indicate wear of the bearing liner of each of the lined bearings.

13. The system according to claim 12, further comprising a remote display, connected to the signal processing means, to provide a warning of excessive wear of the bearing liners of the lined bearings.

14. The system according to claim 12, wherein the signal processing means includes a multiplexer and signal coordinator.

15. The system according to claim 12, wherein the signal processing means is detachable from the electrical conductors.

* * * * *